United States Patent Office 3,329,644
Patented July 4, 1967

3,329,644
ACRYLONITRILE POLYMERS MODIFIED WITH HIGH MOLECULAR WEIGHT N,N-DIMETHYLAMIDES
Gerd R. Baur and William B. Henderson, Decatur, Ala., and James R. Misenheimer, Raleigh, N.C., assignors to Monsanto Company, a corporation of Delaware
No Drawing. Filed Dec. 18, 1962, Ser. No. 245,396
7 Claims. (Cl. 260—32.6)

This invention relates to new compositions of matter and shaped articles produced therefrom. More particularly, this invention relates to the modification of polymers containing at least 80 percent of acrylonitrile with high molecular weight N,N-dimethylamides in order to improve the moldability and the flexural and antistatic properties of these polymers for the production of useful articles of manufacture.

Polyacrylonitrile is known to have various properties which make it a very desirable material in the field of plastics. It is highly resistant to common organic solvents; it is chemically inert; it has a high softening point, and it can be prepared easily by conventional free radical polymerization techniques. Some of the qualities, however, heretofore have been considered drawbacks to broader usage of this polymer. The high softening point, while favoring dimensional stability of a finished article of manufacture, makes unmodified polyacrylonitrile almost impossible to mold by the usual compression or injection methods. Exceptionally high temperatures are required, leading to discoloration. The chemical inertness which imparts solvent resistance is due to strong inter-chain hydrogen bonding. At the same time, however, this property is believed to lead to extreme rigidity, brittleness, and low impact and flexural strength in the polymer. Accordingly, polymers containing predominant amounts of combined acrylonitrile have been generally unsuitable for various applications, particularly in the manufacture of molded articles and as a film-forming or fiber-forming composition due to the poor flowing properties of this polymer and because of the brittle character of the finished product. Plasticizers heretofore incorporated with polymers containing a predominance of combined acrylonitrile in order to improve the flexural properties of these polymers have not been satisfactory, largely because of the significant incompatibility of the plasticizing compound resulting in a gradual migration of the plasticizer to the surface with consequent brittleness and often discoloration, or because the plasticizer is water soluble and is consequently leached from the polymeric article upon contact with water, also resulting in brittleness. The present invention avoids such shortcomings and provides an improved plasticized polyacrylonitrile composition having excellent flexural properties in which the plasticizer is water insoluble and fully compatible with the polymer.

In addition, acrylonitrile polymers constitute a class of material which develop, or tend to develop, an electrostatic charge upon their surfaces when fibers or other articles made therefrom are subjected to friction during their production and during processing or fabrication of the fibers into fabrics or other articles, as well as during the use of the finished article. Before fibers of acrylonitrile polymers are spun into yarns it is necessary to modify the electrical qualities so that the fibers will generate a minimum amount of electricity during carding, combing, spinning, and like operations where the fibers are rubbed in constant frictional contact. The presence of static electricity on the fibers creates a severe problem, because it not only results in sticking of the fibers to the machinery, but also tends to cause the fibers to repel each other during such operations as carding and drawing so that it is difficult or impossible to spin a coherent, compact yarn from them.

Another problem of major importance encountered with filaments and fibers of acrylonitrile polymers is to so lubricate or soften the yarn that it will have the correct frictional characteristics, or drag, and the required flexibility for the specific purpose in view. In the handling of continuous filament yarn, for example, it is necessary to condition the material to reduce the tendency toward breakage of individual filaments when the yarn is subjected to mechanical strains such as are involved in passage of the yarn over guides, rolls, and other parts of the yarn-producing mechanism and in twisting, winding, reeling and similar operations. In the case of the yarns intended for use on commercial knitting machinery, it is particularly important that the yarn be soft and pliable in order that it may conform to the contour of the needles and give a closely knit fabric free from cuts, pinholes, stitch distortion, laddering, misplaits, and the like.

It is an object of the present invention to provide acrylonitrile polymer compositions which have improved moldability and product flexibility.

It is another object of this invention to provide acrylonitrile polymer compositions having improved antistatic properties.

Other objects and advantages of this invention will be apparent from the consideration of the description of the invention which follows hereafter.

The objects of this invention are accomplished in general by the incorporaton of small quantities of high molecular weight N, N-dimethylamides containing at least 6 carbon atoms into acrylonitrile polymer compositions.

These dimethylamide compounds employed in the present invention are contemplated as permanent additives which are permitted to remain in the shaped homopolymer or copolymer to provide continuing flexibility and excellent antistatic properties in the article of manufacture.

The polymeric materials, which may be employed in the practice of the present invention, are polyacrylonitrile, copolymers, including binary and ternary polymers containing at least 80 percent by weight of acrylonitrile in the polymer molecule, or blends comprising polyacrylonitrile or copolymers comprising acrylonitrile with from 2 to 50 percent of another polymeric material, the blend having an overall polymerized acrylonitrile content of at least 80 percent by weight. While the preferred polymers employed in the present invention are those containing at least 80 percent of acrylonitrile, generally recognized as the fiber-forming acrylonitrile polymers, it will be understood that the invention is likewise applicable to polymers containing less than 80 percent of acrylonitrile and the same improvements are realized with the additives defined herein. The acrylonitrile polymers containing less than 80 percent acrylonitrile are useful in forming films, coating compositions, molding operations, lacquers, and the like, in all of which applications the improved properties shown by the compositions of this invention are extremely important.

For example, the polymer may be a copolymer of from 80 to 98 percent of acrylonitrile and from 2 to 20 percent of another monomer containing the $>C=C<$ linkage and copolymerizable with acrylonitrile. Suitable mono-olefinic monomers include acrylic, alpha-chloroacrylic and methacrylic acids; the acrylates, such as methylmethacrylate, ethylmethacrylate, butylmethacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro-1-bromo-ethylene; methacrylonitrile; acrylamide and methacrylamide; alpha-chloroacrylamide, or monoalkyl substitution products thereof methyl vinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; itaconic acid and itaconic ester; N-vinylcarbazole; vinyl furane; alkyl vinyl esters; vinyl sulfonic acid; ethylene alpha,beta-dicarboxylic acids or their anhydrides or derivatives, such as diethylcitraconate, diethylmesaconate, styrene, alpha-methyl styrene, vinyl naphthalene; vinyl-substituted tertiary heterocyclic amines, such as the vinylpyridines and alkyl-substituted vinylpyridines, for example, 2-vinylpyridine, 4-vinylpyridine, 2-methyl-5-vinylpyridine, and the like; 1-vinylimidazole and alkyl-substituted 1-vinylimidazoles, such as 2-, 4-, or 5-methyl-1-vinylimidazole, and other >C=C< containing polymerizable materials.

The polymer may be a ternary interpolymer, for example, products obtained by the interpolymerization of acrylonitrile and 2 or more of any of the monomers, other than acrylonitrile, enumerated above. More specifically, the ternary polymer can comprise acrylonitrile, methacrylonitrile, and 2-vinylpyridine. The ternary polymers preferably contain from 80 to 98 percent of acrylonitrile, from 1 to 10 percent of a vinylpyridine or a 1-vinylimidazole, and from 1 to 18 percent of another substance, such as methacrylonitrile, vinyl acetate, methyl acrylate, or vinyl chloride.

The polymer may also be a blend of a polyacrylonitrile or of a binary inter polymer of from 80 to 99 percent acrylonitrile and from 1 to 20 percent of at least one other >C=C< containing substance with from 2 to 50 percent of the weight of the blend of a copolymer of from 10 to 70 percent of acrylonitrile and from 30 to 90 percent of at least one other >C=C< containing polymerizable monomer. Preferably, when the polymeric material comprises a blend, it will be a blend of a copolymer of 90 to 98 percent of acrylonitrile and from 2 to 10 percent of another mono-olefinic monomer, such as vinyl acetate, with a sufficient amount of copolymer of from 10 to 70 percent of acrylonitrile and from 30 to 90 percent of a vinyl-substituted tertiary heterocyclic amine, such as a vinylpyridine or 1-vinylimidazole, to give a blend having an overall vinyl-substituted tertiary heterocyclic amine content of from 2 to 10 percent, based on the weight of the blend.

The dimethylamides used in preparing the compositions of this invention are amides of the formula

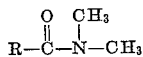

wherein R is a hydrocarbon radical containing at least 6 carbon atoms. Preferably, the amide will contain from 6 to 22 carbon atoms. These amides may be present in amounts of from about 0.5 to about 20.0 percent by weight, based on the total weight of the composition. It is preferred, however, that the compositions of this invention contain from about 1.0 to about 10.0 percent by weight of amide, based on the total weight of the composition.

Illustrative of suitable saturated amides that may be used in the preparation of the compositions of this invention are N,N-dimethylcaprylamide,
N,N-dimethyllauramide,
N,N-dimethylmyristamide,
N,N-dimethylpalmitamide,
N,N-dimethylstearamide,
N,N-dimethylarachidamide,
N,N-dimethylbehenamide,
N,N-dimethyllignoceramide,
N,N-dimethylcerotamide, and the like.

Illustrative of suitable unsaturated amides that may be used in the preparation of the compositions of this invention are N,N-dimethylpalmitoleamide,
N,N-dimethyloleamide,
N,N-dimethylpetroselinamide,
N,N-dimethylvaccenamide,
N,N-dimethyllinoleamide,
N,N-dimethyllinolenamide,
N,N-dimethyleleostearamide,
N,N-dimethylparinaramide,
N,N-dimethylgodoleamide
N,N-dimethylarachidonamide,
N,N-dimethylcetoleamide,
N,N-dimethylerucamide,
N,N-dimethylnervonamide, and the like.

The dimethylamides used in the preparation of the compounds of this invention may be prepared by reacting an acid anhydride with a dialkyl amine such as dimethyl amine.

The incorporation of the amides in the acrylonitrile polymer composition may be conducted by any suitable procedure, such as by dissolving in a common solvent or by blending on a two-roll mill or by use of a Banbury mixer. To lessen the possibility of discoloration, it is generally advisable to employ blending temperatures as low as possible, although temperatures up to about 175° C. and even higher may be employed with certain polymers and mixing cycles. The proportion of the acrylonitrile polymer composition and the amide additive in the composition of our invention may be varied widely, depending mainly upon the properties desired in the particular use for which the composition is intended.

In the preparation of a fiber comprising the new compositions of this invention the amides may be added to the polymer at any step prior to spinning the fiber. The amides may be added as an ingredient in the initial dope preparation or they may be injected into the dope stream prior to spinning. In the case of dope pigmented fibers, the amides may be added to the pigment master batch and may be injected into the dope stream as a part of the pigment master batch.

The compositions of this invention may be shaped or fabricated, as by extrusion, molding, casting, spinning, and the like, into a wide variety of useful articles. If it is desired to produce shaped articles from the compositions of this invention which have a modified appearance or modified properties, various agents may be added to the compositions by incorporation therein at any suitable stage of the operation to accomplish these effects prior to the fabrication of the articles without any ill effects thereon. Such agents that might be added are pigments, dyes, fire-retarding agents, lubricants, heat stabilizers, ultra-violet light stabilizers, and the like.

The following examples are used to illustrate the invention and are not intended to limit it in anyway. Unless otherwise noted, percentages as given in the examples indicate percent by weight.

*Example 1*

A solution was prepared by adding 98.7 grams of N,N-dimethylmyristamide to 2,714 grams of dimethylacetamide solvent. This mixture was chilled to −10° C. and 987 grams of a polymer comprising 94 percent of acrylonitrile and 6 percent of vinyl acetate were added to the mixture. The solution was then heated and mixed for 20 minutes at a temperature of approximately 75° C. The resulting solution, containing approximately 9 percent of N,N-dimethylmyristamide based on the total solids weight, was spun into fiber using standard laboratory procedures. The fiber produced had a homogeneous structure and appeared normal under microscopic examination of a cross section of the fiber. The fiber flex life was measured on an MIT Flex tester using a 1.5 kg. load on 3 ends of a 15 denier yarn. The average flex cycles to break the fiber for 10 runs on the tester was approximately 985 as compared with approximately 53 for the unmodified fiber.

Example 2

A solution was prepared by adding 49.4 grams of N,N-dimethylstearamide to 2,764 grams of dimethylacetamide solvent. This mixture was chilled to −10° C. and 987 grams of a polymer comprising 94 percent of acrylonitrile and 6 percent of vinyl acetate were added to the mixture. The solution was then heated and mixed for 20 minutes at a temperature of approximately 75° C. The resulting solution, containing approximately 4.7 percent of N,N-dimethylstearamide based on the total solids weight, was spun into fiber using standard laboratory procedures. The fiber produced had a homogeneous structure and appeared normal under microscopic examination of a cross section of the fiber. Fiber flex life was measured on an MIT Flex tester using a 1.5 kg. load on 3 ends of a 15 denier yarn. The average flex cycles to break the fiber for 10 runs on the tester was approximately 698 as compared with approximately 53 for the unmodified fiber.

Example 3

A solution was prepared by adding 170 grams of N,N-dimethylmyristamide to 2,736 grams of dimethylacetamide solvent. The mixture was chilled to −10° C. and 912 grams of a polymer comprising 94 percent of acrylonitrile and 6 percent of vinyl acetate were added to the mixture. The solution was then heated and mixed for 20 minutes at a temperature of about 75° C. The resulting solution, containing approximately 15 percent of N,N-dimethylmyristamide based on the total solids weight, was spun into fiber using standard laboratory procedures. The fiber produced had a homogeneous structure and appeared normal under microscopic examination of a cross section of the fiber. Fiber flex life was measured on an MIT Flex tester using a 1.5 kg. load on 3 ends of a 15 denier yarn. The average flex cycles to break the fiber for 10 runs on the tester was 205 as compared with about 53 for the unmodified fiber.

Example 4

A spinning solution containing 1.04 kilograms of N,N-dimethyloleamide, 20.8 kilograms of a polymer comprising 94 percent of acrylonitrile and 6 percent of vinyl acetate, and 60.0 kilograms of dimethylacetamide solvent was prepared. The resulting spinning solution, containing approximately 5 percent of N,N-dimethyloleamide, based on the total solids weight, was spun into fiber by a wet spinning method using standard procedures.

The following values were obtained upon testing the above fiber.

Carding fly, grains/lb., carded _____ 2.6
Turbo fly, grains/lb., processed _____ 4.0
Tricot rating _____ 1.3

The following values were obtained for an unmodified fiber prepared without any N,N-dimethyloleamide present.

Carding fly, grains/lb., carded _____ 10.5
Turbo fly, grains/lb., processed _____ 7.0
Tricot rating _____ 1.7

The carding fly values shown above and in subsequent examples were obtained by standard cotton system textile testing procedures which involve accumulating and weighing in grains all fly resulting from processing fiber and then dividing the pounds processed into the grains of fly.

The turbo fly values shown above and in subsequent examples were obtained by standard turbo system testing procedures which involve accumulating and weighing in grains all fly resulting from processing fiber and then dividing the pounds processed into the grains of fly.

The tricot rating values shown above and in subsequent examples were obtained by abrading two different places on a standard fabric strip using 150 cycles with a known weight on a flex bar. Then readings are made with a photovolt reflectance photometer on both abraded places and on two unabraded places. Each of these two values are averaged to give an average value for the abraded and the unabraded. The tricot rating is read directly from the machine as the difference in reflectance values between abraded and unabraded.

Lower values in these tests show increased plasticizing effect and less fly in processing.

Example 5

A spinning solution containing 210 grams of N,N-dimethyloleamide, 20.8 kilograms of a polymer comprising 94 percent of acrylonitrile and 6 percent of vinyl acetate, and 60.0 kilograms of dimethylacetamide was prepared. The resulting spinning solution, containing approximately 1.0 percent of N,N-dimethyloleamide based on the total solids weight, was spun into fiber by a wet spinning method using standard procedures.

The following values were obtained upon testing the above fiber:

Carding fly, grains/lb., carded _____ 8.5
Turbo fly, grains/lb., processed _____ 4.4
Tricot rating _____ 1.3

Example 6

A spinning solution containing 20.8 kilograms of a polymer comprising 94 percent of acrylonitrile and 6 percent of vinyl acetate and 60.0 kilograms of dimethylacetamide was prepared. Prior to spinning, 2.75 grams of N,N-dimethylstearamide and 2.75 grams of carbon black per 100 grams of total solids were added to the spinning solution. The resulting spinning solution, containing approximately 2.75 percent of N,N-dimethylstearamide based on the total solids weight, was spun into fiber by a wet spinning method using standard procedures.

The following values were obtained upon testing the above fiber:

Carding fly, grains/lb., carded _____ 3.8
Turbo fly, grains/lb., processed _____ 4.4

Example 7

*Preparation of fiber A.*—A spinning solution containing 20.8 kilograms of a polymer comprising 94 percent of acrylonitrile and 6 percent of vinyl acetate and 60.0 kilograms of dimethylacetamide was prepared. The spinning solution was spun into fiber by a wet spinning method using standard procedures. The fiber obtained was passed through a standard finish bath containing soya dimethyl amino ethyl ethosulfate as an antistatic agent.

*Preparation of fiber B.*—A spinning solution containing 1.04 kilograms of N,N-dimethyloleamide, 20.8 kilograms of a polymer comprising 94 percent of acrylonitrile and 6 percent of vinyl acetate, and 60.0 kilograms of dimethylacetamide was prepared. The resulting spinning solution, containing approximately 5 percent of N,N-dimethyloleamide based on the total solids weight, was spun into fiber by a wet spinning method using standard procedures. The fiber obtained was passed through the standard finish bath used in the preparation of fiber A with the exception that this bath did not contain antistatic agent.

*Preparation of fiber C.*—This fiber was prepared according to the procedure used to prepare fiber A above with the exception that no antistatic agent was placed in the finish bath.

Fiber A. fiber B, and fiber C were tested for static protection. The following results were obtained:

|  | Initial Electrical Charge | Charge After Two Minutes, Microamperes | Half Life sec. |
| --- | --- | --- | --- |
| Fiber A | 0 | 10 | 1 |
| Fiber B | 0 | 0 | 0 |
| Fiber C | Could not process on cotton system due to static. | | |

In making the determinations given above, static electricity was induced on the test samples by means of a Hayek apparatus. The amount of static retained on the test samples over a given period of time was measured by means of a microampere meter. The Hayek apparatus consists of a metallic wheel rotating around its axis which is driven by a motor. The sample to be examined is fixed at the periphery of the wheel in close contact with a swatch of wool which is mounted on a copper plate and does not move. The friction between the rotating sample and the wool swatch generates static electricity, the amount of which is shown on the connected microampere meter. After two minutes of friction generation the amount of static shown on the dial is recorded, the contact between the sample and the wool swatch is broken and the wheel continues to rotate in order to dissipate the accumulated static. The time (expressed in minutes and seconds) necessary for the examined sample to dissipate half of the static (expressed in microamperes) accumulated during the two minutes contact with the wool is the criterion for the effectiveness of the treatment. This value may be termed the "half life" of the static charge. If the half life exceeds ten minutes there is considered to be little antistatic property present.

As many widely different embodiments of this invention may be made without departing from the spirit and scope thereof, it is to be understood that the invention is not limited to the specific embodiments thereof except as defined in the appended claims.

We claim:

1. A new composition of matter consisting essentially of a polymer selected from the group consisting of polyacrylonitrile and a copolymer containing at least 80 percent of polymerized acrylonitrile with up to 20 percent of another mono-olefinic monomer, copolymerized therewith, and from about 0.5 to 20 percent, based on the total weight of the composition, of an amide having the formula

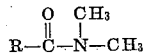

wherein R is a hydrocarbon radical containing at least 6 carbon atoms.

2. A new composition of matter consisting essentially of a polymer selected from the group consisting of polyacrylonitrile and a copolymer containing at least 80 percent of polymerized acrylonitrile with up to 20 percent of another mono-olefinic monomer, copolymerized therewith, and from about 1.0 to 10.0 percent, based on the total weight of the composition, of an amide having the formula

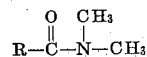

wherein R is a hydrocarbon radical containing from 6 to 22 carbon atoms.

3. A new composition of matter as defined in claim 2 wherein the polymer is a copolymer containing from 80 to 98 percent of acrylonitrile and from 2 to 20 percent of another polymerizable mono-olefinic monomer copolymerized therewith.

4. A new composition of matter as defined in claim 3 wherein the selected compound is N,N-dimethyloleamide.

5. A new composition of matter as defined in claim 3 wherein the selected compound is N,N-dimethylstearamide.

6. A new composition of matter as defined in claim 3 wherein the selected compound is N,N-dimethylmyristamide.

7. A shaped article prepared from the composition of matter as defined in claim 2.

References Cited

UNITED STATES PATENTS

| | | |
|---|---|---|
| 2,325,957 | 8/1943 | Garvey. |
| 2,531,407 | 11/1950 | D'Alelio. |
| 2,786,043 | 3/1957 | Schuller et al. |

FOREIGN PATENTS

| | | |
|---|---|---|
| 901,202 | 7/1962 | Great Britain. |

MORRIS LIEBMAN, *Primary Examiner.*

D. W. ERICKSON, B. A. AMERNICK,
*Assistant Examiners.*